United States Patent [19]

Knibbs et al.

[11] 4,219,421
[45] Aug. 26, 1980

[54] FILTER APPARATUS

[75] Inventors: Richard H. Knibbs, Steventon; Dennis Wood, Wallingford, both of England

[73] Assignee: The Secretary of State for Energy in her Britannic Majesty's Government of the United Kingdom of Great Britain and Northern Ireland, London, England

[21] Appl. No.: 7,560

[22] Filed: Jan. 29, 1979

[30] Foreign Application Priority Data

Feb. 13, 1978 [GB] United Kingdom ................ 5584/78

[51] Int. Cl.² ............................................. B01D 25/12
[52] U.S. Cl. ..................................... 210/98; 210/49; 210/108; 210/411; 210/486
[58] Field of Search ................ 210/98, 108, 343, 344, 210/411, 486, 488, 492, 90, 88, 333 R, 500 M, 49

[56] References Cited

U.S. PATENT DOCUMENTS

| | | | |
|---|---|---|---|
| 3,137,652 | 6/1964 | Grave | 210/486 |
| 3,157,598 | 11/1964 | Rebiscoul | 210/486 |
| 3,195,729 | 7/1965 | Kracklaver et al. | 210/344 |
| 3,263,819 | 8/1966 | Schmidt et al. | 210/488 |
| 3,343,681 | 9/1967 | Madden | 210/344 |
| 3,401,803 | 9/1968 | Bub | 210/488 |
| 3,627,131 | 12/1971 | Goodman et al. | 210/108 |
| 3,825,120 | 7/1974 | Takahashi | 210/108 |

FOREIGN PATENT DOCUMENTS 655385 7/1947 United Kingdom ..................... 210/486

*Primary Examiner*—Frank W. Lutter
*Assistant Examiner*—Gregory N. Clements
*Attorney, Agent, or Firm*—Larson, Taylor and Hinds

[57] ABSTRACT

A filter apparatus comprising a number of filter trays arranged in layers to form a stack. Each filter tray is of a glass fibre reinforced plastics material and comprises a central web having upstanding and depending parallel ribs extending between one end of the filter tray to the other end thereof so as to define a number of parallel channels. A micro filtration or ultra filtration membrane is interposed between adjacent filter trays, and alternate ends of the channels are closed so that liquid flowing along a channel in one filter tray flows through the membrane and leaves the stack through the open end of the channel in the adjacent filter tray.

The filter trays are located in a plastic tube held within a demountable pressure casing having a header plate to divide the casing into two chambers each connected to a respective end of the filter trays.

9 Claims, 13 Drawing Figures

FILTER APPARATUS

This invention relates to filter apparatus, and in particular to micro filtration or ultra filtration filter apparatus and filter plant incorporating such filter apparatus.

According to a first aspect of the present invention, a filter apparatus comprises arrays of parallel channels defined by a stiff plastics material and arranged in layers to form a stack, alternate layers being inverted to arrange that in adjacent layers each channel in one of said adjacent layers is opposite a said channel in the other said adjacent layer and said opposite channels either have adjacent openings along the length of said opposite channels or have adjacent bases, and micro filtration or ultra filtration membrane means interposed between said opposite channels at said adjacent openings, the channels on one side of each membrane means being open at one end of the length of the stack for a feed liquid to enter said channels, and the channels on the other side of said membrane means being open at the other end of the stack for filtrate from said feed liquid to leave the stack after flowing through the membrane means into said channels.

Preferably, the adjacent bases are provided by a single member, the member having a plurality of said oppositely disposed channels and providing a common said base for said plurality of oppositely disposed channels.

The invention also includes a said single member of a stiff plastics material in accordance with said preferred first aspect of the invention.

Desirably, the parameters of the channels open at said one end of the stack in relation to the rate of flow of the feed liquid are arranged to provide turbulent flow of said feed liquid over the membrane means.

Preferably, port means are provided near said other end of the stack in those channels open at said one end of the stack for rejecting some of the feed liquid, so as to provide a cross-flow of feed liquid across the membrane means.

According to a second aspect of the present invention, a filter plant comprises a feed pump means for feeding a feed liquid, a filter apparatus according to the first aspect of the invention and to which the feed pump means is arranged to deliver the feed liquid, and a reservoir to which filtrate from the filter apparatus is arranged to be delivered.

Preferably, back-wash pump means are provided in parallel between the reservoir and the filter apparatus for back-washing the filter apparatus with filtrate from the reservoir.

Preferably, means are provided for controlling the rate at which feed liquid is rejected by the filter apparatus so as to control the rate of flow of filtrate from the filter apparatus.

The invention will now be described by way of example only with reference to the accompanying drawings, in which.

Figure 1:
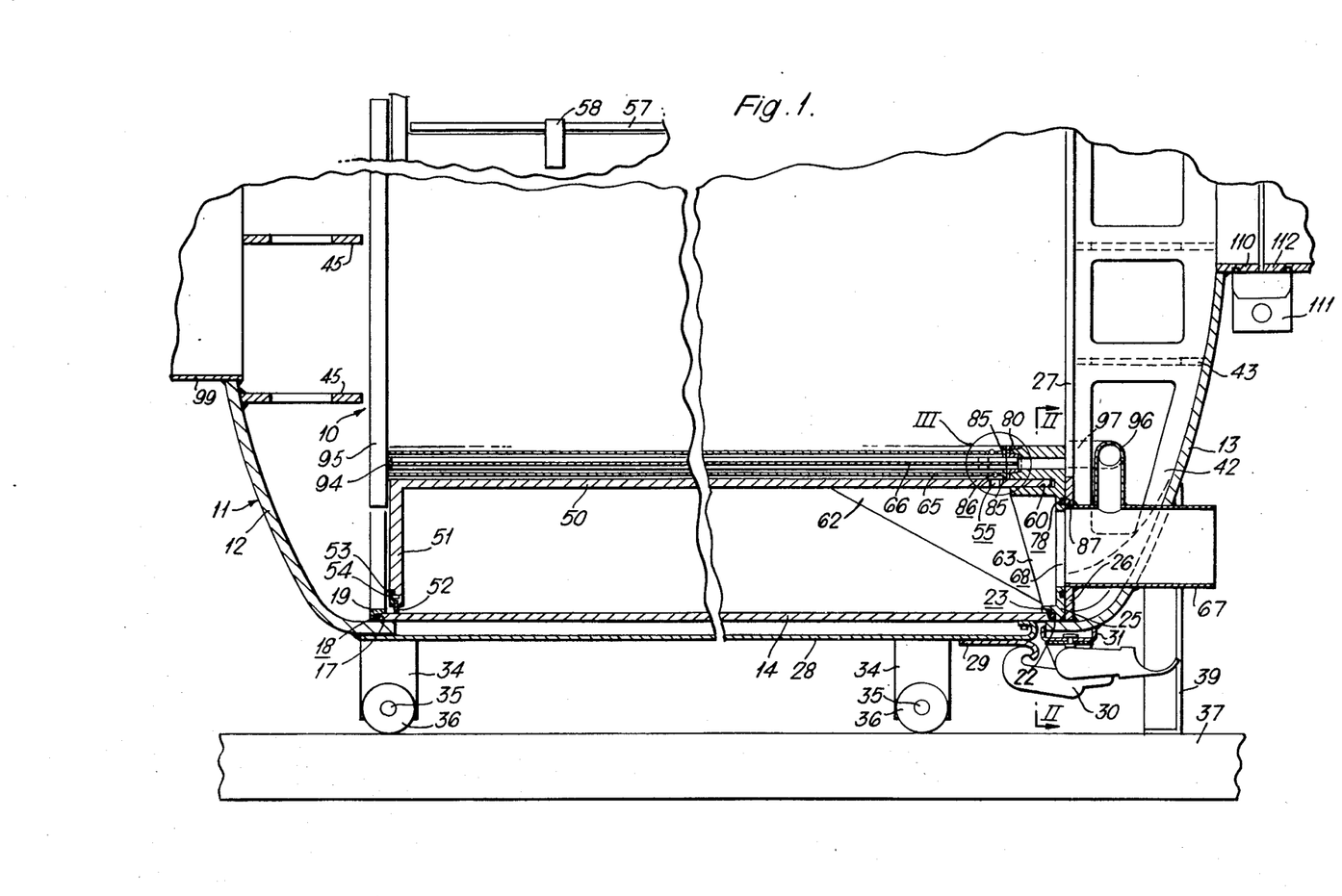
FIG. 1 shows a sectional elevation of part of a filter assembly.
Figure 2:
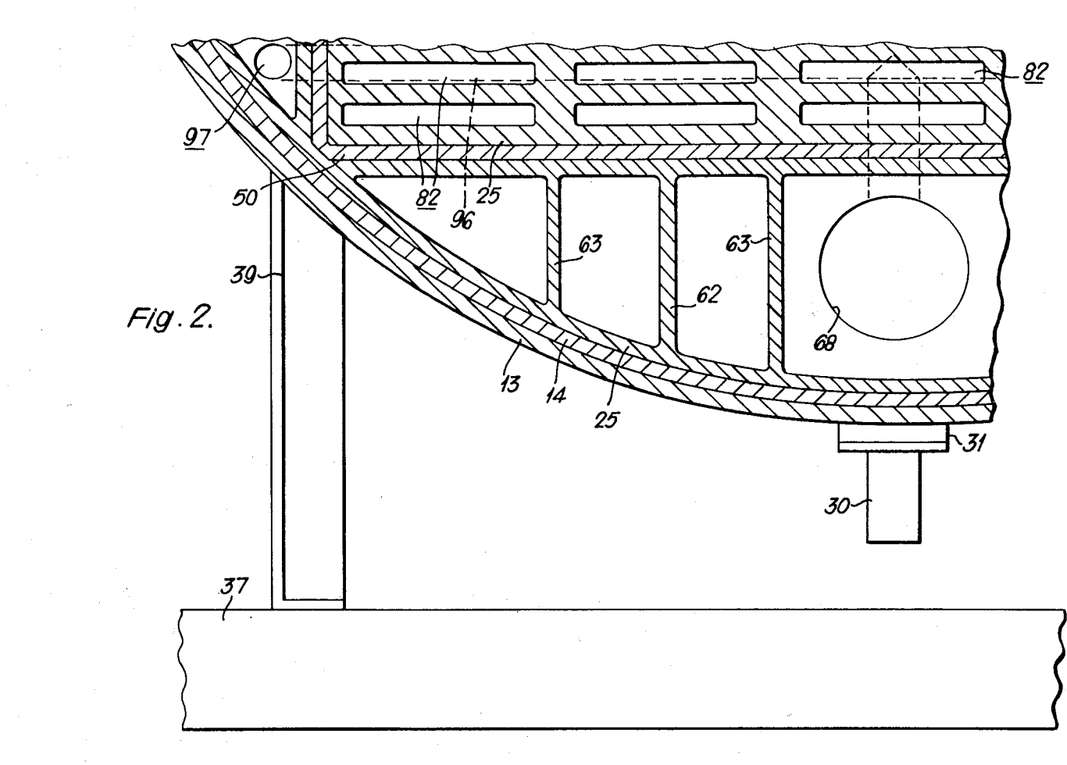
FIG. 2 shows a sectional view on the line II—II of FIG. 1.

Referring now to FIGS. 1 and 2, the filter assembly is shown in its operating position and comprises a filter unit 10 in a demountable pressure case 11 provided by stainless steel curved feed and product end covers 12 and 13 respectively which support between them a glass fibre reinforced epoxy resin central tube 14. The central tube 14 locates at its left-hand end in sealing engagement with an 'O' ring seal 17 in an annular groove 18 defined by a stainless steel circular rim 19 welded to the inside of the feed end cover 12. The right hand end of the central tube 14 locates in sealing engagement with an 'O' ring seal 22 in an annular groove 23 defined by a shaped glass fibre reinforced epoxy resin header plate 25 secured by screws (not shown) to a stainless steel pressure plate 26 having a central orifice 27 and welded to the inside of the product end cover 13.

A plurality of steel tie strips 28 (only one is shown) are evenly distributed around the pressure case 11, each tie strip 28 having one end welded to the outside surface of the feed end cover 12, and being turned inwardly at its other end and secured to the central tube 14 by self-tapping screws (not shown) near the right-hand end of the central tube 14. A steel catch 29 is welded to the outward facing side of each tie strip 28 to provide a location for complementary toggle catch fasteners 30 each of which is bolted to a base 31 which is welded to the outside surface of the product end cover 13. Steel legs 34 extend from the lowermost tie strips 28, and each leg 34 provides a location for an axle pin 35 upon which a pair of steel wheels 36 are mounted and rest on a base plate 37 to allow the feed end cover 12 and central tube 14 to be pulled away from the header plate 25, filter unit 10, and product end cover 13.

Two legs 39 (only one is shown) are welded to the product end cover 13 and support it from the base plate 37 to which they are located by screws (not shown). Horizontally and vertically directed stainless steel apertured ribs 42 and 43 respectively extend between and are welded to the pressure plate 26 and the inside surface of the product end cover 13 to brace the pressure plate 26, and stainless steel horizontally directed apertured ribs 45 extend in and are welded to the feed end cover 12.

The filter unit 10 comprises a glass fibre reinforced epoxy resin square section filter tube 50 having an external flange 51 at its left-hand end and which extends near to the inside surface of the central tube 14. The flange 51 at its perimeter is recessed to locate a flat rubber ring 52 which is held in sealing engagement with the inside surface of the central tube 14 by an annular stainless steel plate 53 secured to the flange 51 by countersunk screws 54 (only one is shown).

The top portion of the filter tube 50 is provided by a removable plate 57 which is held in position by several stainless steel spring catches 58 (only one is shown). The right-hand end of the filter tube 50 is slidably located in an annular groove 60 in the header plate 25, and joined to the header plate 25 by an epoxy adhesive. Several ribs 63 (only one is shown) are distributed about the header plate 25 to brace the header plate 25, and two webs 62 (only one is shown) extending from the header plate 25 support the base of the filter tube 50.

Twenty-seven feed filter trays 65 and twenty-six filtrate filter trays 66 each of a glass fibre reinforced moulded plastics material such as polyester, acetal, polycarbonate and modified polyphenylene oxide (Noryl), are disposed alternately one above the other inside the filter tube 50 to form a stack, the filtrate filter trays 66 being longer than the feed filter trays 65.

As shown more clearly in FIGS. 3 and 4 to which reference is now made, each feed filter tray 65 and filtrate filter tray 66 comprises a central horizontal web 70 having twenty-two aligned upstanding and depending parallel ribs 71 to define twenty-one parallel channels 72 both above and below the horizontal web 70. Five feed filter trays 65 or five filtrate filter trays 66 are disposed side by side (only two are shown) in the filter tube 50 to provide layers 73 of one hundred and five channels 72 across the width of the filter tube 50. The configurations of the feed filter trays 65 and filtrate filter trays 66 are such that the channels 72 in adjacent layers 73 are inverted with respect to each other so that opposite channels 72 in adjacent layers 73 either share a common base (the web 70) or have adjacent openings along the length of the channels 72.

Figure 4:
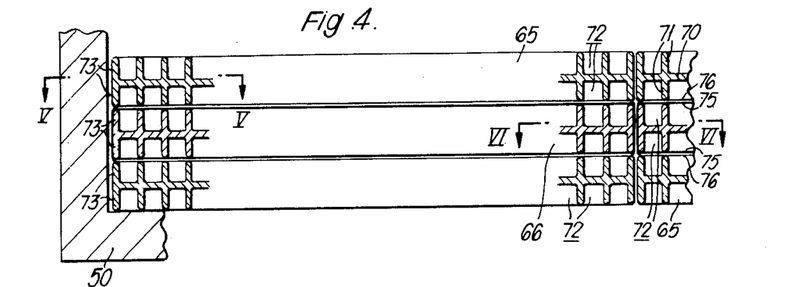
FIG. 4 shows a fragmentary sectional view of the line VI—VI of FIG. 3.
Figure 4A:
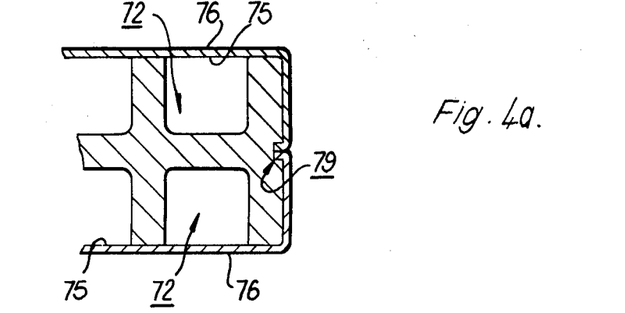
FIG. 4a shows to an enlarged scale, a sectional fragmentary view of part of the assembly of FIG. 4.

A 240 mesh polyester monofilament filter cloth 75 extends across the top and an identical filter cloth 75 extends across the bottom of each filtrate filter tray 66, and are both secured to the sides of the filtrate filter trays 66 by an epoxy resin adhesive. A micro filtration membrane 76 is stretched across each filter cloth 75 and is sealingly joined at its edges to the respective filter cloth 75 by a contact adhesive such as Evostick. In order to avoid damaging the filter cloths 75, the ends of the parallel ribs 71 are suitably rounded, and an end strip 77 parallel to the web 70 and at the right-hand end of each channel 72 in the filtrate filter trays 66 provides a supporting attachment for a respective filter cloth 75. To assist the adhesive to resist the pull on the filter cloth 75 in the use of the filter unit 10, the ends of the filter cloth 75 as shown in FIG. 4a to which reference is made, may be retained by the adhesive in a central slot 79 at each side of the filtrate filter trays 66 (the slots 79 not being shown in FIG. 4 for clarity).

Figure 3:
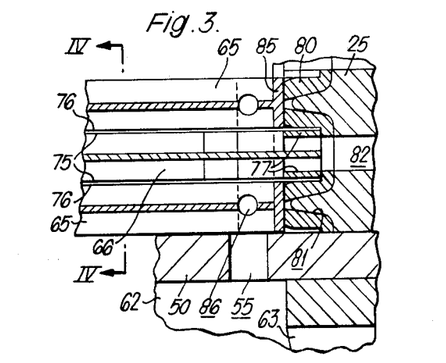
FIG. 3 shows a sectional view to an enlarged scale of that part of FIG. 1 within the circle III of FIG. 1.

Referring particularly to FIG. 3, the right-hand end of each filtrate filter tray 66 is open and extends in sealing engagement in a rubber grommet 80 located in a recess 81 in the header plate 25, and is aligned with a rectangular shaped orifice 82 in the header plate 25. The right-hand end of each feed filter tray 65 is closed by a barrier strip 85, but a central reject port 86 extends through the horizontal web 70 and the ribs 71 of each feed filter tray 65 near the barrier strip 85 to allow rejected feed solution to leave the feed filter trays 65.

Figure 5:
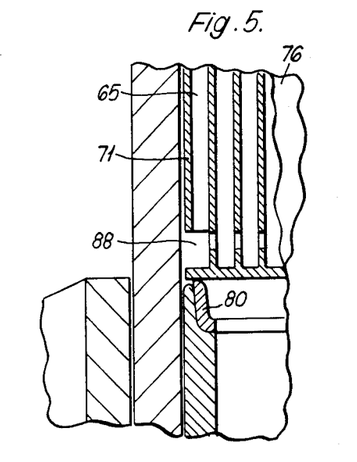
FIG. 5 shows a fragmentary sectional view on the line V—V of FIG. 4.

Referring now to FIG. 5, the ribs 71 at the sides of the feed filter trays 65 (only one side is shown) and the corresponding portion of the horizontal webs 70 thereof are relieved to define a vertical reject channel 88 at each side of the feed filter trays 65 adjacent to the header plate 25, the reject channels 88 being aligned with outlets 55 in the filter tube 50 as shown in FIG. 1 to which reference can be made. This allows the rejected feed solution to flow into the cavities between the filter tube 50 and the central tube 14 from which it leaves the filter unit 10 through two orifices 68 in the header plate 25 positioned one above and one below the filter tube 50, and through two stainless steel outlet pipes 67 welded to the pressure plate 26 and aligned with respective orifices 68. The outlet pipes 67 extend through the product end cover 13 to which they are welded to discharge the reject feed solution out of the filter assembly, and 'O' ring seals 87 (only one is shown) in respective annular grooves 78 in the header plate 25 prevent rejected feed solution leaking between the header plate 25 and the pressure plate 26 from each orifice 68 (only one is shown).

Figure 6:
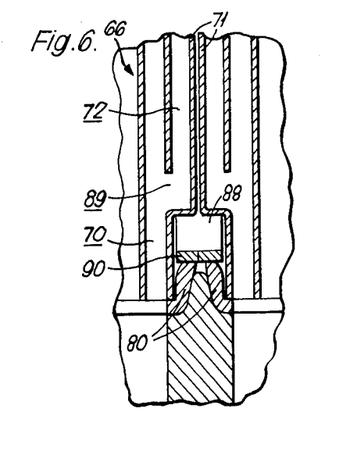
FIG. 6 shows a fragmentary sectional view on the line VI—VI of FIG. 4.

Each filtrate filter tray 66 is shaped in a similar manner to that of the feed filter trays 65 as shown in FIG. 6 to which reference is made, to define vertical reject channels 88 at each side thereof, except that the ribs 71 at the sides of each filtrate filter tray 66 are shaped so as to follow the edge of its horizontal web 70. The ribs 71 adjacent to the ribs 71 at each side of each filtrate filter tray 66 are shorter than the other ribs 71 to provide an opening 89 through which filtrate in the channels 72 at the sides of the filtrate filter trays 66 can flow into adjacent channels 72 so as to flow through a corresponding orifice 82.

Figure 7:
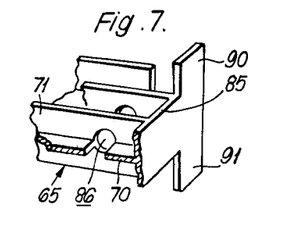
FIG. 7 shows a perspective view of part of FIG. 3.

The barrier strips 85 of the feed filter trays 65, as shown in FIG. 7, have upstanding and depending portions 90 and 91 respectively which extend half-way into the reject channels 88 defined by adjacent filtrate filter trays 66 to bear against the rubber grommets 80 except, referring to FIG. 1, at the bottom and top (not shown) of the filter unit 10.

The left-hand end of each feed filter tray 65 is open, whereas an end strip 94 closes the corresponding end of the channels 72 in each filtrate filter tray 66. Several glass fibre reinforced epoxy resin pressure bars 95 (only one is shown) are clamped to the external flange 51 and bear against the ends of the feed filter trays 65 and filtrate filter trays 66 so as to press the barrier strips 85 at the right hand ends of the feed filter trays 65 against the rubber grommets 80 and thereby compress the rubber grommets 80 in sealing engagement about the micro filtration membranes 76 on the filtrate filter trays 66. The ribs 45 in the feed end cover 12 are arranged to extend to within about 0.010" (shown exaggerated for clarity) of the pressure bars 95 to limit any deflection of the pressure bars 95 when the filter assembly is backwashed and thereby retain the sealed engagement between the rubber grommets 80 and the micro filtration membranes 76.

In order to equalise the liquid pressure about the filter tube 50, a feed pipe 96 (only one is shown) extends from each outlet pipe 67 to apertures 97 (only one is shown) in the header plate 25 and positioned one at each side of the filter tube 50. Feed solution is supplied to the feed end cover 12 through a feed inlet 99, and filtrate leaves the product end cover 13 through the product outlet 110 which is joined by a hydraulic coupling 111 to a product pipe 112.

In use of the filter assembly of FIGS. 1 to 7, feed solution flows through the feed inlet 99 and into and along the channels 72 in the feed filter trays 65. In flowing along the channels 72, filtrate from the feed solution flows through the micro filtration membranes 76 into the channels 72 in the filtrate filter trays 66 and then through the respective orifice 82 and the central orifice 27 into the space between the header plate 25 and the inside surface of the product end cover 13 from which the filtrate leaves the filter assembly through the product outlet 110.

Feed solution after flowing along the channels 72 in the feed filter trays 65, flows through the reject ports 86 into the reject channels 88, then through the outlets 55 into the cavities between the filter tube 50 and central tube 14, and finally through the respective apertures 68 and outlet pipes 67 to leave the filter assembly. This flow of the feed solution along the channels 72 provides a cross-flow over the micro filtration membranes 76 and reduces the rate of build-up of solid residue on the micro filtration membranes 76. For a similar reason the dimensions of the channels 72 and the rate of flow of the feed solution through the channels 72 are preferably selected to ensure turbulent flow of the feed solution over the micro filtration membrane 76.

Figure 8:
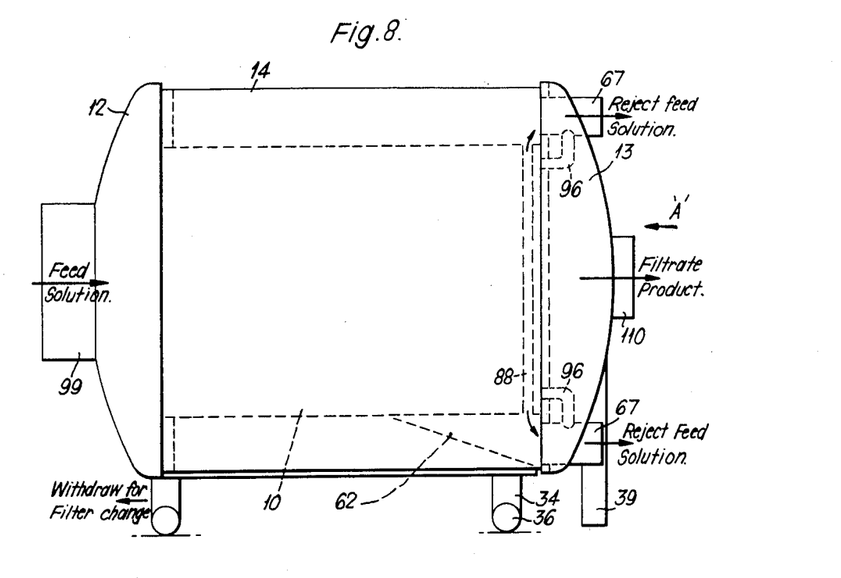
FIG. 8 shows in elevation a diagrammatic representation of fluid flow through the filter assembly of FIGS. 1 to 7.
Figure 9:
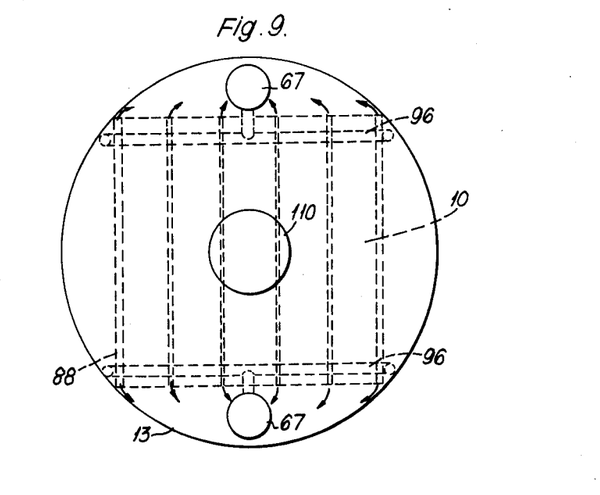
FIG. 9 shows a diagrammatic view in the direction of arrow 'A' of FIG. 8.

The flow of the feed solution and filtrate therefrom through the filter assembly of FIGS. 1 to 7 is shown diagrammatically in FIGS. 8 and 9 to which reference can be made, structural details of the filter unit 10 being omitted for clarity.

The micro filtration membrane 76 may be provided by a microporous film of a co-polymer of acrylonitrile and polyvinyl chloride on a woven polyester or nylon web, such as AN 200 membrane supplied by Gelman Hawkeley Limited, Lancing, Sussex, England. The membranes 76 may be replaced when necessary by withdrawing the central tube 14 with the feed end cover 12 away from the product end cover 13, and removing the plate 57 from the top of the filter tube 50, and the pressure bars 95 from the left-hand end of the filter unit 10, to enable the feed and filtrate filter tray 65 and 66 respectively to be lifted out of the filter tube 50. The old micro filtration membranes 76 may then be stripped off the filter cloths 75 and replaced by new micro filtration membranes 76.

The toggle fasteners 30 may be, for example, the type 4S-515 fastener supplied by Protex Fasteners Limited, Arrow Road, Redditch, England.

A suitable hydraulic coupling 111 may be supplied by the Victaulic Company, 46-48 Wilbury Way, Hitchin, Hertfordshire, England.

Figure 10:
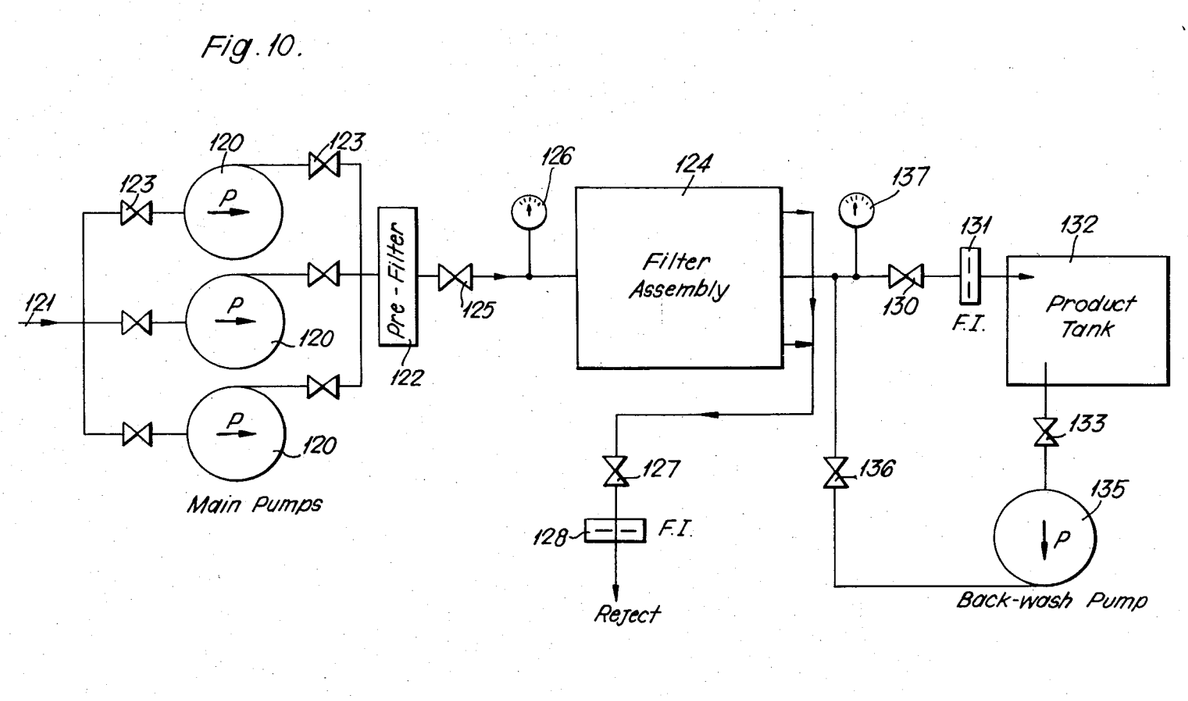
FIG. 10 shows a flow diagram of a filter plant.

Referring now to FIG. 10, the filter plant shown in schematic layout comprises three main pumps 120 connected in parallel relationship and arranged to be fed from an inlet 121 for feed solution and discharge to a 25 μm pre-filter 122 in series with a filter assembly 124 of FIGS. 1 to 7. Control valves 123 are inserted in the inlet to and outlet from each main pump 120, and a control valve 125 is inserted in the line between the pre-filter 122 and the filter assembly 124, a pressure gauge 126 being provided between the control valve 125 and the filter assembly 124.

A reject line from the filter assembly 124 has a reject valve 127 and a flow indicator 128 so that the reject valve 127 can be adjusted to provide a required reject flow from the filter assembly 124 (e.g. 20% of the product flow from the filter assembly 124).

A product line from the filter assembly 124 leads through a control valve 130 and a flow indicator 131 to a product tank 132, a pressure guage 137 being inserted between the control valve 130 and the filter assembly 124. An outlet from the product tank 132 controlled by a control valve 133 is connected to a back-wash pump 135 which is connected through a control valve 136 to the outlet side of the filter assembly 124.

The filter assembly and plant described in relation to FIGS. 1 to 10 for a particular application could have the following characteristics:

Micro filtration membrane (76)—0.2 μm maximum pore size
total membrane area—27.3 m²
operating pressure—up to 100 p.s.i.
output of product flow—820 m³/hr
reject flow through reject valve (57)—20% of inlet flow into filter unit (10)

In operation the control valve 125 and reject valve 127 would be adjusted, and control valve 130 fully opened, to provide the above characteristics from an inlet flow of 1025 m³/hr control valves 133 and 136 respectively being closed. When the product flow through the flow indicator 131 falls by 15–20%, backwashing of the filter assembly 124 is necessary, and this is achieved by closing control valve 125, fully opening reject valve 127, opening control valves 133 and 136 respectively, closing control valve 130, and operating the back-wash pump 135, control valve 130 subsequently being opened if necessary to ensure that the backwash pressure does not exceed a predetermined value e.g. 20 p.s.i.

The filter plant is versatile in the sense that the product output is approximately proportional to the operating pressure, so that by isolating any of the main pumps 120 by closing the appropriate valves 123 and operating at a lower pressure e.g. 50 p.s.i., the product is correspondingly reduced (e.g. to ~400 m³/hr).

The filter plant may incorporate two filter assemblies 124 connected in parallel relationship, with the backwash from the back-wash pump 135 arranged so that one of the filter assemblies 124 can be isolated and backwashed while the other filter assembly 124 is on-stream.

It will be understood that the invention is not restricted to use of the above-mentioned materials, and appropriate alternative materials may be used. These alternative materials are preferably plastics materials to retain one of the advantages of the invention of obtaining a relatively high flow per unit weight of equipment.

When the filter assembly of FIGS. 1 to 7 is required for use as an ultra filtration filter, the micro filtration membrane 76 of FIGS. 1 to 7 may be replaced by an ultra filtration membrane having the required molecular weight cut-off, for example an ultra filtration membrane having a molecular weight cut off of 20,000, such as the Rhône-Poulene IRIS 3042 membrane available from Rhône-Poulene Chemie Fine, 21 Rue Jean-Goujon, F75360 Paris, France.

Figure 11:
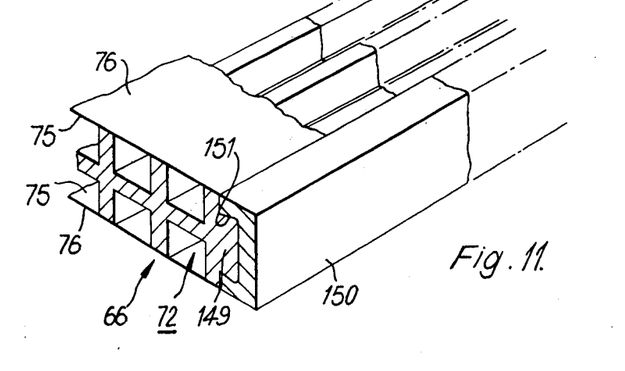
FIG. 11 shows to an enlarged scale a fragmentary perspective view of a modification of the filter assembly of FIG. 1.

As an alternative to the use of a slot 79 to retain the ends of the filter cloth 75 and membrane 76 as shown in FIG. 4a, the arrangement shown in FIG. 11 may be used. In FIG. 11 a side section of a filtrate filter tray 66 is shown and has a shaped tongue portion 149 over which is fitted a resilient plastics elongate clip 150 having a corresponding groove 151. The ends of the filter cloths 75 are affixed around the tongue portion 149, and the ends of the membrane 76 similarly affixed to the filter cloth 75. The clip 150 is then snapped into place about the tongue portion 149 to provide additional mechanical fixing and to assist in maintaining the filter cloth 75 and membrane 76 taut.

Figure 12:
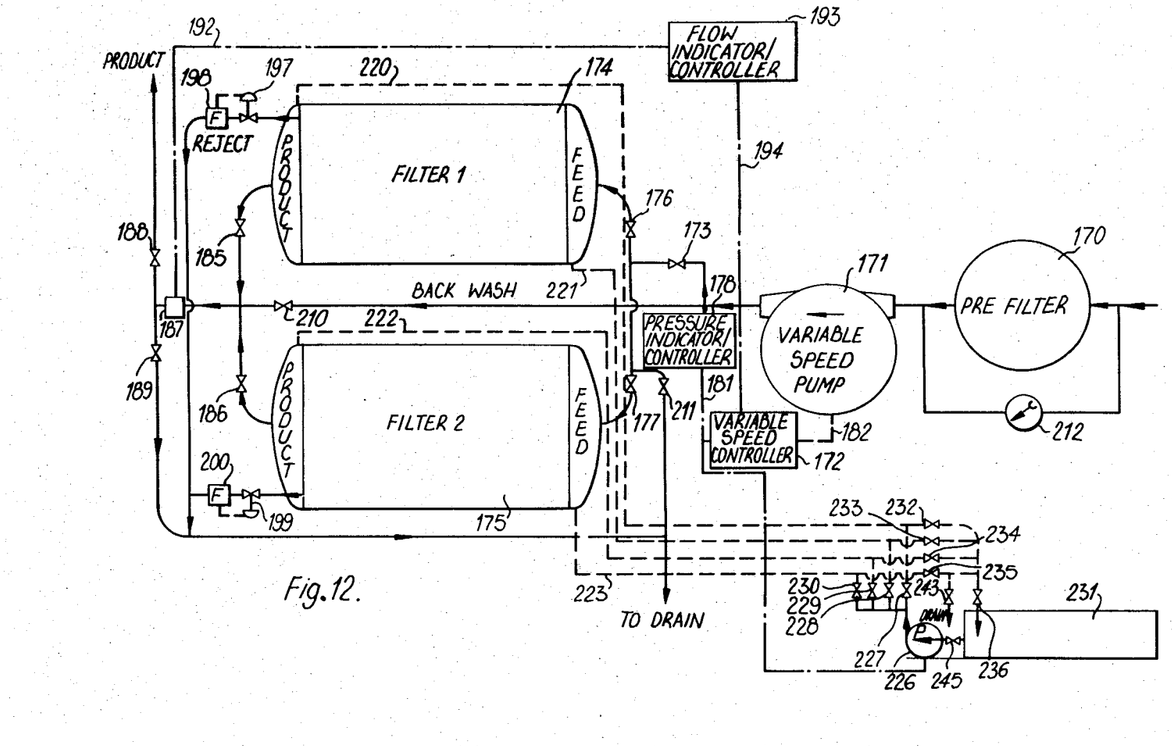
FIG. 12 shows a flow diagram of an alternative filter plant.

As an alternative to the filter plant of FIG. 10, the filter plant of FIG. 12 may be used to provide an automatic backwashing feature. Referring to FIG. 12, the filter plant shown in schematic layout comprises a pre-filter unit 170, a variable speed pump 171 having a speed controller 172 for delivering feed liquid from the pre-filter unit 170 through a control valve 173 to two filter assemblies 174 and 175 respectively of FIGS. 1 to 7 or 11 in parallel, each having an isolating valve 176 or 177 respectively, and to a pressure indicator/controller 178 connected by a signal line 181 to the variable speed controller 172 itself connected by a signal line 182 to the variable speed pump 171. The filter assemblies 174 and 175 each has a product outlet having a shut-off valve 185 or 186 respectively which connects with a line to a flow controller 187 and to a T-junction between two shut-off valves 188 and 189 respectively. Shut-off valve 188 is connected to an outlet from the filter plant and shut-off valve 189 is connected to a drain line. The flow controller 187 is connected by a signal line 192 to a flow indicator/controller 193 itself connected by a signal line 194 to the variable speed controller 172.

A reject line from the filter assembly 174 connects with a valve 197 controlled by a flow controller 198 and is subsequently connected to a drain line. Similarly, a reject line from the filter assembly 175 connects with a valve 199 controlled by a flow controller 200 and is subsequently connected to the drain line.

A line having a shut-off valve 210 connects the variable speed pump 171 to the flow controller 187, and a line between the isolating valve 176 and 177 is connected through a shut-off valve 211 to the drain line. A pressure gauge 212 is connected in parallel across the pre-filter unit 170 for determining when cleaning of the pre-filter unit 170 is necessary.

A wash system for the filter plant is provided by wash lines 220 and 221 connected to the product end and feed end respectively of the filter assembly 174, and wash lines 222 and 223 respectively connected to the product end and feed end of the filter assembly 175. Each wash line 220, 221, 222 and 223 is connected in parallel to a pump 226 through a respective valve 227, 228 229 or 230, and to a holding tank 231 for a wash liquid through a respective valve 232, 233, 234 and 235, and a valve 236, or to a drain through a valve 243. The pump 226 is connected to the holding tank 231 through a valve 245, and is controlled by an extension of the signal line 181 from the pressure indicator/controller 172.

Operation of the filter plant of FIG. 12 is as follows:

When filtration starts the filter assembly 174 or 175 on-stream will supply the specified flow at a low pressure, say 15 p.s.i. When the pressure required to maintain this flow has increased by 20 p.s.i. the filter assembly 174 or 175 will backwash for ~1 minute and then resume filtering. For the first 20 seconds after backwashing, the filtrate will be sent to waste to flush out any dirt from the backwash water. The flow of filtrate is therefore interrupted for ~80 seconds per filter/backwash cycle.

After each backwash some 95% of the flow rate is recovered so that there will be a gradual build up of filter pressure with time, in spite of the intermittent backwashing, if the flow rate is to be maintained. The pressure required to provide the specified flow after each backwash is registered by the control system and the next backwash is initiated when this pressure has increased by 20 p.s.i. After 4 to 5 hours, depending on the feed water quality, pressures of 100 p.s.i. may be required and at this stage the filter assembly 174 or 175 is shut down and the other filter assembly 175 or 174 brought on steam.

During the 4–5 hours that the other filter assembly 175 or 174 is filtering, the first used filter assembly 174 or 175 undergoes cleaning and flux regeneration by means of the circulation of a solution of an enzymatic detergent.

To ensure flow across the membrane in the filter assemblies 174 or 175 they may be operated at 90% water recovery so that 10% of the feed water will be rejected at the product end of the filter assembly 174 or 175 and passed through the flow controller 198 or 200 set to maintain the 10% reject flow.

Backflushing pressure should be 30 p.s.i., and the mean flow demand will be approximately the same as for filtering.

Control of the filter plant of FIG. 12 is as follows:

Consider filter assembly 174 being used to filter feed liquid from the variable speed pump 171 and filter assembly 175 being washed.

(1) Valves 185, 188, 173 and 211 open, and valves 176, 189, 210, 177 and 186 closed.

(2) Open valve 176, close valve 211. Set flow indicator controller 193 at the required flow rate (e.g. 690 m$^3$/hour). As valve 176 and valve 211 change the pressure rises to about 15 p.s.i. to provide this flow. When the product flow has reached the required flow rate, the pressure indicator/controller 178 will register initial pressure, i.e. ~15 p.s.i. As the resistance of the filter assembly 174 increases, the flow controller 187 increases the speed of the variable speed pump 171 to maintain the flow at 690 m$^3$/hour. When the pressure of the filter assembly 174 has risen by 20 p.s.i., (i.e. to 35 p.s.i. on the first filter cycle) the pressure indicator/controller 178 initiates the backwash cycle. During the filter cycle the reject flow controller 198 maintains the reject flow at 69 m$^3$/hour, i.e. 10% of the product flow.

(3) Backwash cycle is then initiated, valve 211 opens, valve 188 closes, valve 210 opens and valve 173 closes for 1 minute. The pressure indicator/controller 178 overrides the flow indicator/controller 193 during the backwash cycle and maintains a pump 171 speed consistent with a pressure of 30 p.s.i. irrespecitve of flow.

(4) Flush cycle is then initiated and valves 189 and 173 open and valves 210 and 211 close for 20 seconds and control of the pump 171 is returned to the flow indicator/controller 193.

(5) The filter cycle is resumed when valve 189 closes and valve 188 opens. As valve 188 opens the pressure indicator/controller 178 registers the new initial pressure for the filter cycle.

Over a period of about four hours the start pressure for each filter cycle rise slowly to a maximum allowable of 80 p.s.i. as the unflushed filter burden builds up. The pressure indicator/controller 178 has a high pressure change-over switch (not shown) set at 100 p.s.i. which will drop the pump 171 to the lowest speed and initiate the filter assembly 174 or 175 change-over sequence. Filter assembly 175 then comes on stream with valves 177 and 186 open, and valves 176 and 185 closed to take out filter assembly 174. The change-over also initiates the wash cycle for filter assembly 174.

Wash cycle for filter assembly 174

(1) Drain filter via line 221 and valve 243 to waste, with valve 236 closed. Circulate detergent solution from tank 231 via pump 226, valve 245, valve 227, line 220, line 221, valve 233, and valve 236 with valves 232 and 225 closed—5 minutes.

(2) Rest—5 minutes, then circulate detergent via valve 228, line 221, line 220, valve 232 and valve 236, with valves 233 and 237 closed—5 minutes. Rest—5 minutes, continue this cycle for 4 hours.

(3) Drain via line 221 and valve 233, then close all valves 227–230, 232–236 and 243.

The operation control, and wash cycle of filter assembly 175 can be carried out in a similar manner to that described above.

An enzymatic detergent such as "Biz" has been found suitable as a wash liquid for membrane cleaning in the wash cycle, a solution of 1–2% in water being effective.

It is important not to exceed about 20 p.s.i. pressure rise during the filter cycle since higher pressures can lead to a compaction of the fouling on the membrane and make backwashing less effective.

The choice of pre-filter 170 is not critical, and a cleanable metal mesh filter between 80–25 μm should be satisfactory.

The signal lines 181, 182, 192, 194 may be provided by conventional electric or pneumatic lines.

The filter plant of FIGS. 10 and 12 may be constructed in modular form to assist transport of the filter plant to a site where it can be assembled in situ.

We claim:

1. A filter apparatus comprising,
(a) a demountable casing arranged to be disposed with the longitudinal axis thereof substantially horizontal, the casing having a fixed portion and a movable portion thereof, the movable portion comprising a tubular portion having at one end thereof a domed end cover having an inlet port for liquid to be filtered, the fixed portion comprising a domed end cover having an outlet port for filtrate and an inwardly directed flange defining a space between one side of the flange and the inside surface of the fixed portion end cover, the flange having a discharge duct at the top and at the bottom thereof, which discharge ducts extend through the fixed portion end cover so as to discharge liquid from the other side of the flange through the fixed portion end cover to the other side of the fixed portion end cover, and having a feed duct at each side of the flange extending from a respective orifice in the flange so as to exhaust into a respective discharge duct;
(b) sealing means at the open end of the tubular portion;
(c) releasable means for clamping together the movable portion and the fixed portion;
(d) means for supporting the fixed portion;
(e) movable means for supporting the movable portion;
(f) a header plate comprising glass fibre reinforced plastics material secured in sealing engagement to said other side of the flange, the header plate having a plurality of apertures therethrough of horizontally elongate section and arranged one above the other, respective outlet orifices corresponding in position with that of the respective discharge ducts and the feed ducts, and a square section annular groove therearound in that portion of the header plate between the orifices and the apertures thereof;
(g) grommet sealing means of elastomeric material located in a recess extending in the header plate around each said aperture;
(h) a filter unit comprising glass fibre reinforced plastics material and arranged to be situated inside the casing, the filter unit comprising,
 (i) a square-shaped tube corresponding in section with the annular groove so as sealingly to locate in said groove, and having an outwardly directed flange at one end thereof for supporting said tube from the casing,
 (ii) sealing means at the extremity of the outwardly directed flange so as to seal against the casing,
 (iii) an odd number of filter trays comprising glass fibre reinforced plastics material located in the filter tube one above the other to form a stack, alternate filter trays in the stack being longer than the other filter trays and aligned with a respective elongate aperture in the header plate, and the shorter filter trays being disposed between and about the longer filter trays, each filter tray comprising a central web having upstanding and depending parallel ribs so as to define a parallel array of channels between said one end and the other end of said filter tray above the web and below the web,
 (iv) a micro filtration membrane means comprising a polyester monofilament cloth having thereon a micro filtration membrane comprising a copolymer of acrylonitrile and polyvinylchloride, said membrane means being disposed between adjacent filter trays and sealingly joined to the respective longer filter trays,
 (v) means for closing one end of each longer filter tray and of each shorter filter tray, the other end of each said longer filter tray and of each said shorter filter tray being open, the filter trays being disposed so that the closed ends of the shorter filter trays abut adjacent said grommet sealing means and the longer filter trays at the open ends thereof extend in sealing engagement inside a respective said grommet sealing means, each filter tray being shaped at each side thereof near the grommet means to define a vertically directed channel, and each said shorter filter tray having a port means near the closed end thereof for the flow of liquid from the channels in the shorter filter tray to the vertically directed channels,
 (vi) port means at the top and at the bottom of the filter unit tube and aligned with the vertically directed channels, and
 (vii) clamping means at the flanged end of the filter unit tube and arranged to bear against the filter trays.

2. A filter apparatus as claimed in claim 1 wherein said filter trays are also disposed, in side by side relationship, each longer filter tray being aligned with a respective elongate aperture in the header plate.

3. A filter apparatus as claimed in claim 1, wherein port means are provided in the channels near said other ends of the shorter filter trays so as to provide a cross-flow of feed liquid across the micro filtration membrane means.

4. A filter apparatus as claimed in claim 1, wherein the filter unit tube has a top portion thereof which is removable to provide acess into the filter tube.

5. A filter apparatus as claimed in claim 1, wherein the longer filter trays have shaped side portions, and an elongate resilient plastics clip is adapted to fit about each said shaped side portion to provide additional mechanical fixing for the membrane means thereon.

6. A filter apparatus as claimed in claim 2, wherein the longer filter trays have elongate, centrally disposed, longitudinally directed slots at each side thereof for retaining the ends of the membrane means and resisting the pull on the membrane means in use of the filter apparatus.

7. A filter plant comprising
(a) a feed pump means for feeding a feed liquid;
(b) a filter apparatus as claimed in claim 2.
(c) means for connecting the feed pump means to the filter apparatus so as to deliver said feed liquid to the filter apparatus;
(d) a reservoir to which filtrate from the filter apparatus is arranged to be delivered;
(e) backwash pump means connectable in parallel between the filter apparatus and the reservoir for backwashing the filter apparatus with filtrate from the reservoir, and
(f) control valve means to which feed liquid rejected from the filter apparatus is arranged to be delivered, said control valve means being adjustable to control the rate at which said feed liquid is rejected by the filter apparatus, thereby to control the rate of flow of filtrate from the filter apparatus.

8. A filter plant comprising: (a) a variable speed pump for delivering a feed liquid; (b) a filter apparatus as claimed in claim 2; (c) first duct means for connecting the variable speed pump to the filter apparatus; (d) means for sensing the rate of flow of filtrate from the filter apparatus and varying the speed of the variable speed pump so as to arrange a substantially constant output of said filtrate from the filter apparatus; (e) means for controlling the rate of flow of feed liquid rejected by the filter apparatus; (f) a backwash pump for a wash liquid; (g) a reservoir connectable to the backwash pump and to which the wash liquid is arranged to be delivered; (h) second duct means for connecting the backwash pump to the filter apparatus so as to wash the filter apparatus with the wash liquid; (i) valving means for controlling the direction of flow of the feed liquid and of the wash liquid through said first and second duct means; and (j) means for sensing the pressure of the feed liquid in the first duct means conducting the variable speed pump to the filter apparatus, and for controlling the backwash pump in response to a predetermined rise in said pressure so as to initiate backwashing of the filter apparatus.

9. A filter plant comprising: (a) a variable speed pump for delivering a feed liquid; (b) a filter apparatus comprising, (i) a plurality of filter trays arranged in layers to form a stack, each filter tray being of a stiff plastics material and comprising a central web having upstanding and depending substantially parallel ribs therefrom, which ribs define a plurality of substantially parallel channels along the filter tray: (ii) micro filtration or ultra filtration membrane means interposed between adjacent filter trays: (iii) a closure at one end and an outlet at the other end of each channel on one side of each membrane means: (iv) an inlet at said one end and a closure at said other end of each channel on the other side of each membrane means, the closures on the one side of each membrane means being at the opposite end of the stack with respect to the closures on the other side of each membrane means: and (v) port means provided near said other end of those channels on the other side of each membrane means, whereby when a feed liquid enters the inlets at the one end of those channels on the other side of each membrane means, filtrate from said feed liquid leaves the stack through the outlets at the other end of those channels on the one side of each membrane means after flowing through said membrane means, and rejected feed liquid leaves the stack through the port means after flowing across the membrane means from said inlets; (c) first duct means for connecting the variable speed pump to the filter apparatus; (d) means for sensing the rate of flow of filtrate from the filter apparatus and varying the speed of the variable speed pump so as to arrange a substantially constant output of said filtrate from the filter apparatus; (e) means for controlling the rate of flow of feed liquid rejected by the filter apparatus; (f) a backwash pump for a wash liquid; (g) a reservoir connectable to the backwash pump and to which the wash liquid is arranged to be delivered; (h) second duct means for connecting the backwash pump to the filter apparatus so as to wash the filter apparatus with the wash liquid; (i) valving means for controlling the direction of flow of the feed liquid and of the wash liquid through said first and second duct means; and (j) means for sensing the pressure of the feed liquid in the first duct means connecting the variable speed pump to the filter apparatus, and for controlling the backwash pump in response to a predetermined rise in said pressure so as to initiate backwashing of the filter apparatus.

* * * * *